March 29, 1960

H. J. SMITH ET AL 2,930,283

OPTICAL COMPARATORS AND THE LIKE

Filed Dec. 2, 1954

INVENTORS
Harry J. Smith
Cornelius F. Dietrich
By Watson, Cole, Grindle & Watson
ATTORNEYS

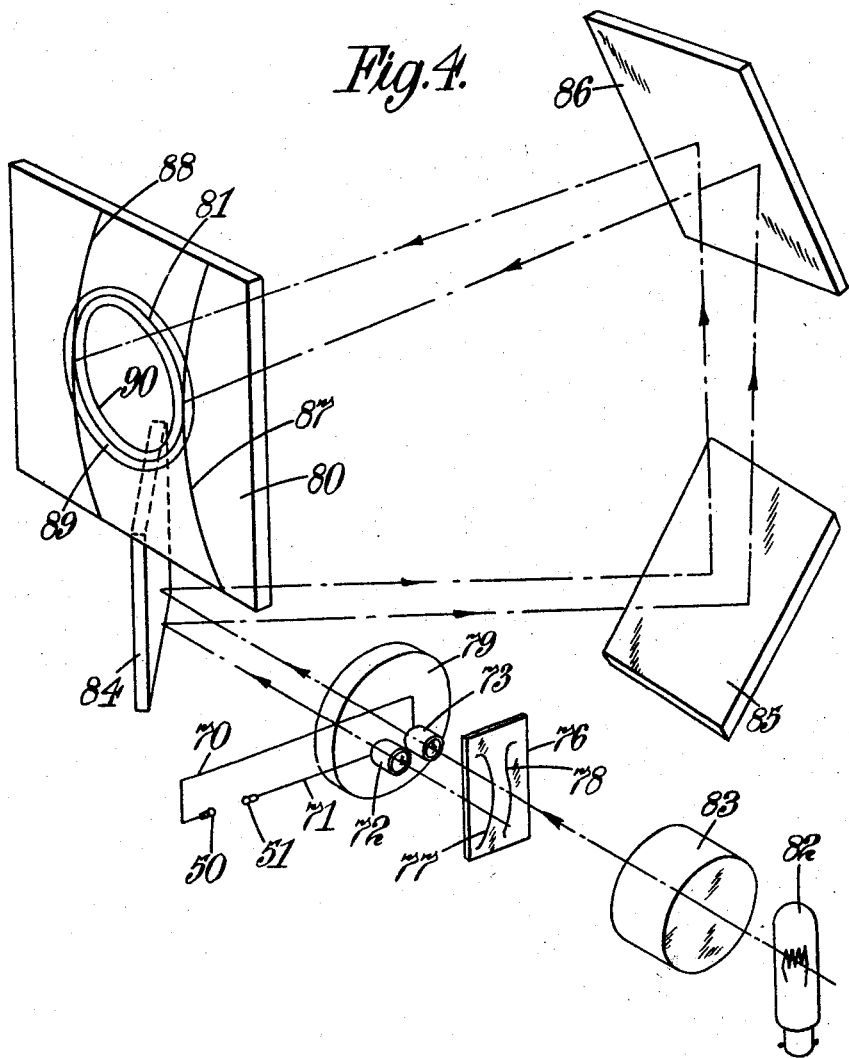

March 29, 1960 H. J. SMITH ET AL 2,930,283
OPTICAL COMPARATORS AND THE LIKE
Filed Dec. 2, 1954 5 Sheets-Sheet 5
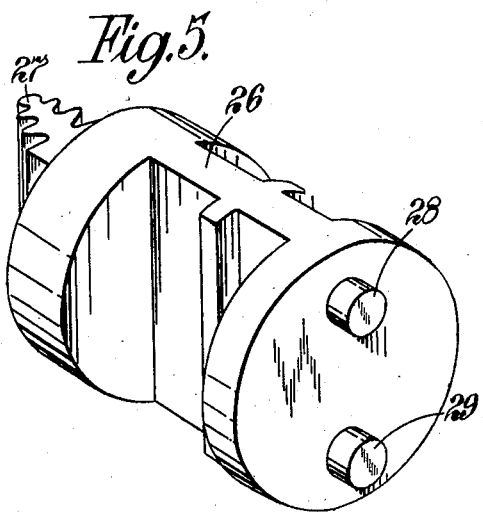
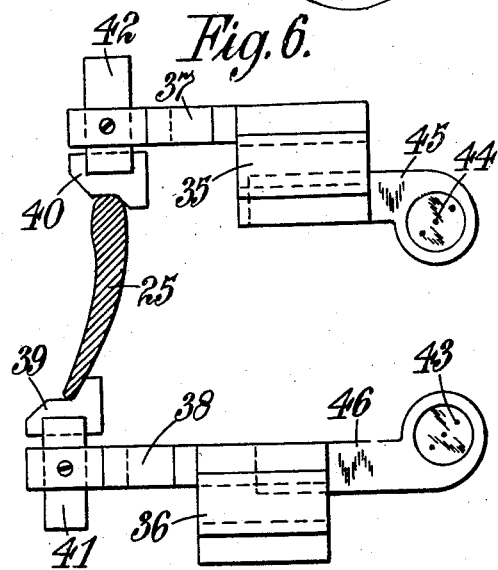

2,930,283

OPTICAL COMPARATORS AND THE LIKE

Harry John Smith and Cornelius Frank Dietrich, Maidenhead, England, assignors to Optical Measuring Tools Limited, Maidenhead, England, a British company Application December 2, 1954, Serial No. 472,692

5 Claims. (Cl. 88—24)

This invention comprises improvements in or relating to optical comparators and the like.

It is well-known to project optically upon a screen a light-spot or an image of a graticule which corresponds in position with a formed member such as a turbine-blade, the shape of which is to be measured, and to cause the light-spot or the graticule to move in relation to an index in such a manner that deviations of the actual form of the object from the desired form are indicated by deviations of the projected image from the index. Such an apparatus is for example described in patent specification No. 2,628,528. Such devices, while they are capable of indicating accurately the outline of a formed object and its deviations from a desired outline, do not afford ready means for measuring its actual dimensions or the relative position of one part of the object to another part, and it is an object of the present invention to afford means for this purpose.

According to one feature of the present invention, a feeler is provided having two feeling surfaces, which are at an angle to one another, so as to locate the feeler when brought in contact with the work-piece in two dimensions, and the feeler is mounted on a carriage capable of being adjusted in the said two dimensions and carrying a graticule, the image of which is focused by an optical system on a large scale upon a screen. By having an index on the screen the exact position of the feeler, and therefore of the work-piece, can be checked in relation to the index. Alternatively the feeler might move the lens and the graticule remain fixed.

By having two feelers to engage the edges or other locating portions of the work-piece, each feeler being connected to a graticule and having an index mark on the screen, the two locating portions of the work-piece can be checked simultaneously for position, and this will afford an indication both of the actual position of each locating portion, of the distance between them (i.e. of the size of the work-piece) and of the angular relationship of the work-piece compared with its true or desired angular relationship.

By taking other measurements at other points or sections along the length of the work-piece, i.e. along the third dimension, information can be obtained not only of the dimensions of the work-piece at each section, but of the relationship of the various sections to each other. Thus for example in the case of a turbine-blade, the information so obtained will show not only whether the blade is of the correct width throughout, but also whether it has any rake forward or backward relatively to its root, and also what the degree of twist of the blade may be.

Preferably the feelers with their graticules are mounted in an instrument which is constructed also to provide a means of checking the outline, such as that described in the aforesaid patent specification No. 2,628,528 and the feelers therein described are run over the same contour or section of the blade or other work-piece as that to which the feelers, according to the present invention, have been applied, so as to afford a check upon the exact shape and thickness of the section in addition to its position and dimensions.

The following is a description of a turbine-blade measuring apparatus constructed in accordance with the present invention:

In the accompanying drawings,

Figure 4 is a similar diagram of the optical system connected with the feelers for comparing the contours;

Figure 5 is a detail of a plug used for setting the instrument, and

Figure 6 is a detail showing the shape of the position indicators.

Figure 2:
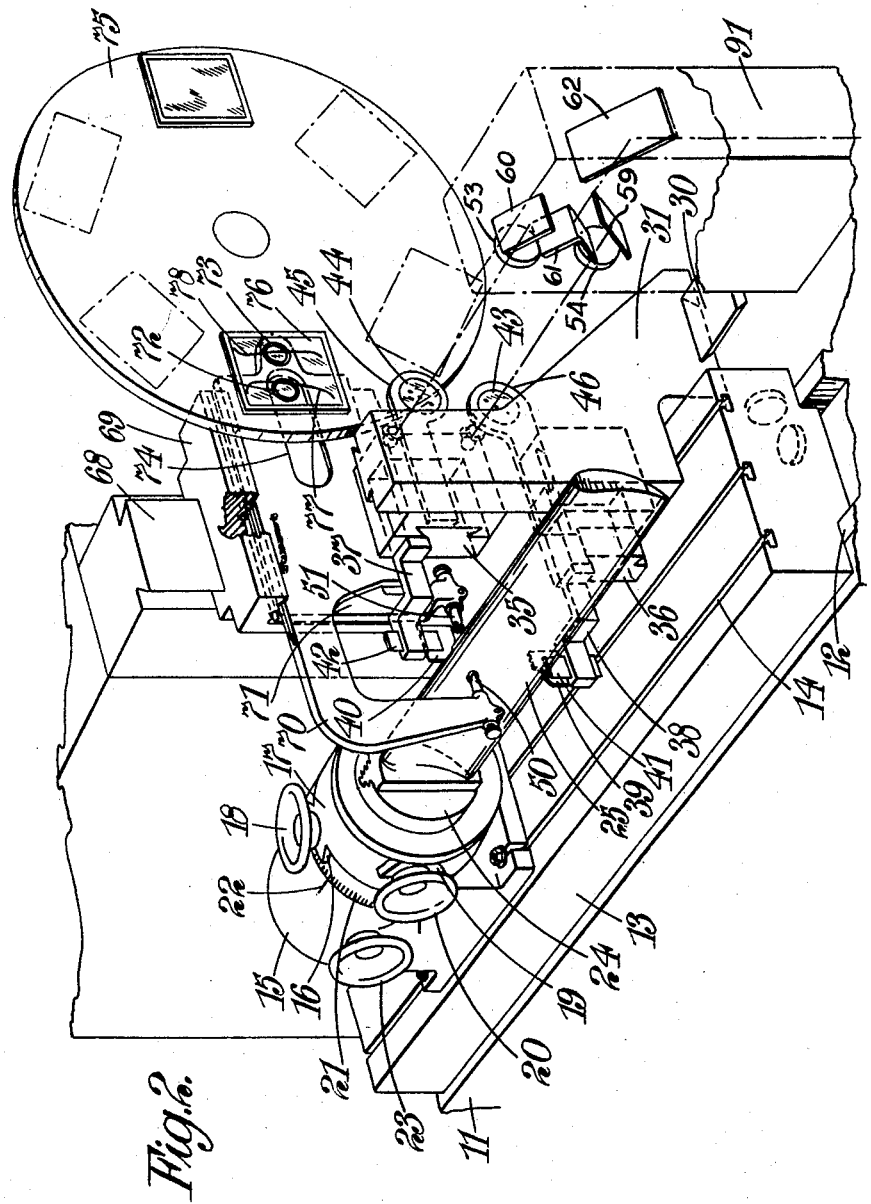
Figure 2 is an enlarged perspective view of the principal working parts.

The apparatus comprises a bed 11 having a longitudinal guide-way 12 thereon on which is mounted a slidable-carriage 13. The carriage is T-slotted as shown at 14 (Figure 2) and has secured to it a blade-carrying head 15. The blade-carrying head comprises a vertical guide 16 in which is supported a vertically movable slide 17 operated by a hand-wheel 18. In this slide is a cross-slide 19 operated by a second hand-wheel 20. Both the slides 17 and 19 are mounted in a rotatable sleeve 21 having a flange with a graduated periphery working against an index mark 22 on the member which supports it. The rotatable sleeve can be turned angularly about its axis, which is horizontal and parallel with the guide-ways of the carriage 13, by a worm or bevel-gear and handle 23. The slide 19 carries a holder 24 for work-pieces 25, and thus any work-piece which is mounted in the holder can be adjusted up or down relatively to the carriage 13 and also transversely, as well as being rotated about the axis of the sleeve 21. In the case of testing turbine blades, the work-piece holder 24 is machined out to fit the roots of the turbine-blades, whereby the blade which is to be tested can readily be slid into the holder for testing, or removed therefrom as indicated in Figure 2. The blade 25, when placed in the holder 24, will extend in a more or less horizontal direction parallel with the guide-ways 13 of the carriage.

In addition to the blades, a test-piece 26 (Figure 5) is provided which has a root 27 to fit the holder and extends forwardly therefrom and carries two locating pins 28, 29, which are set in a position which corresponds to the true or desired position of one part of the turbine-blade when the latter is in the holder.

On the bed 11 behind the guide-way 12 is a second guide-way 30 on which there is mounted for longitudinal movement a feeler slide bracket 31 which extends upwardly from the bed and has a vertical rear face with a vertical guide-way 32 to receive vertically movable carrier slides 33, 34 which support horizontally movable slides 35, 36 on which feeler brackets 37, 38 are mounted.

Figure 3:
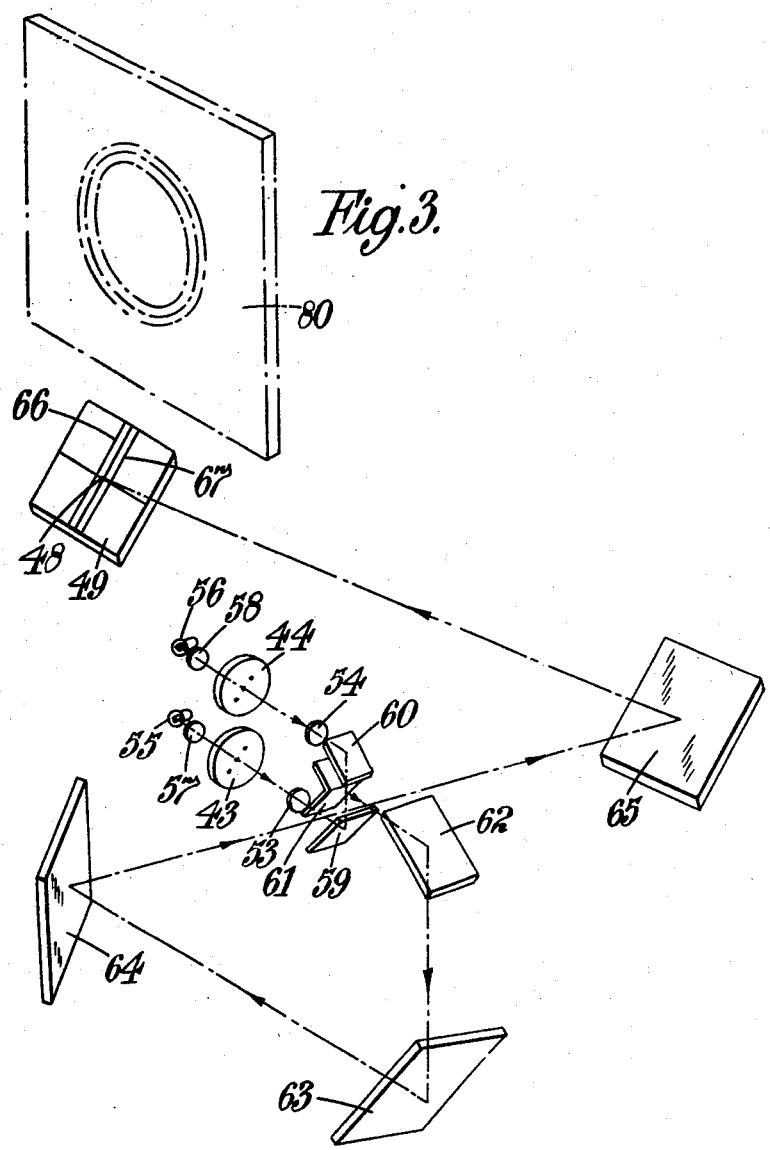
Figure 3 is a diagrammatic representation of the optical system connected with the position indicators.

The horizontally movable slides 35, 36 therefore have a compound movement, both transverse and vertical. The feeler brackets 37, 38 are slotted vertically at their ends to receive the stems of feeler blades 39, 40. The stems of the feelers 39, 40 are shown in Figure 6 at 41, 42. The horizontally movable slides 35, 36 also carry graticule holders 45, 46 in which are mounted graticules 43, 44. The graticules 43, 44 can be adjusted horizontally by adjusting their holders 45, 46 relatively to the slides 35, 36. The glass graticules 43, 44 carry spots and as will be obvious the spots are adjustable relatively to the feelers themselves both horizontally and vertically by reason of the stems of the holders 45, 46 and the stems of the feelers 41, 42. Each feeler 39, 40 is shaped with a V notch. The V notch of the lower feeler 39 faces upwards and the V notch of the upper feeler 40 faces downwards. By moving the slides 35, 36 horizontally and the slide carriers 33, 34 vertically, the feelers can be brought into engagement with the edge of a turbine-blade such as 25 and located by the edge of the blade in a definite position. The brackets 37, 38 are cranked as shown to carry feelers 39, 40 back into a plane which is well clear of the slides 35, 36 so that they can operate in the same plane as the contour feelers 50, 51 hereinafter described. As will be obvious, the feelers 39, 40 can be similarly positioned against the pegs 28, 29 of the test-piece 26 (Figure 5) if the test-piece is put in position on the machine, and when they are located against the test-piece the position of the graticule spots on the graticules 43, 44 can be adjusted by means of the stems 41, 42 of the feelers and the stems of the holders 45, 46 until the spots are brought into the position when, if projected on to a screen, they will coincide with an index mark thereon. The graticules are shown in Figure 3 together with the mirror system which projects the image of the spot on to an index mark 48 as hereinafter described.

In front of each of the graticules 43, 44 there is mounted a projection lens 53, 54 and suitable illuminating means 55, 56 and condensers 57, 58 are provided. A mirror system is so arranged that an image of the graticule is projected on to a projection screen 49.

The mirror system comprises two mirrors 59, 60 set at an angle of 45 degrees to the light beam from the projection lenses 53, 54 respectively so that they turn the two light beams towards one another and make the centre of the image impinge on the apex of a mirror 61 formed with an external right angle so that it causes the images of the central spots on the graticule to coincide and to be projected as a single beam on to a mirror 62 and thence by mirrors 63, 64, 65 to the screen 49. In this way if the feelers 39, 40 have been adjusted relatively to the test-pegs of the test member 26 and to the graticule spots correctly, the images of the spots will coincide on the screen 49. If the blade under test is of such a shape as exactly to correspond to the test-piece the same will be true when the feelers are positioned on the blade, but if the blade differs from exactitude the two spots will be separated from one another on the screen 49 on which tolerance lines 66, 67 can be marked if desired.

Each of the graticules 43, 44 may contain several spots corresponding to different positions of the feelers along the blade 39, 40 and the intention is that one spot should be in use for one position of measurement along the blade, another for a second position and a third for a third position, and if the spots are correctly marked on the graticules and the blade is correctly shaped, the images of the spots at all positions should coincide with the index marks, any deviation from normal in the shape of the work-piece being shown by the projected images of the spots being displaced relatively to the index mark.

Supported on another vertical slide 68 just behind the slide-carrier bracket 31, is a slider 69 for two contour-feeler-slides 70, 71 which are capable of horizontal movement relatively to the vertical slide, and carry the two opposed feelers 50, 51 having tip engagement with opposite sides of the turban blade already referred to and two projection lenses 72, 73 at their rear ends. The slide 71 which is behind the slide 70, as viewed in Figure 2, carries the lens 72 which is located opposite a slot 74 in the front slide 70. The lens 73 on the slide 70 lies normally clear of the slide 71 and does not require any slot. In front of the projection lenses is a graticule-holder 75 carrying several graticules 76 on which are marked the outlines 77, 78 of the correct section of the turbine-blade at a corresponding number of positions of measurement. If one of the contour feeler slides 70, 71 is moved in one direction so that its feeler engages one face of the turbine-blade 25, then the corresponding projection lens on this slide (72 or 73), will come into line with one of the graticules and will project an image of part of the graticule outline on to a large projection screen 80. As the feeler is moved around the turbine-blade, so the projection lens will move around the graticule outline 77 or 78 as the case may be, and any deviation of the turbine-blade from the true outline will be shown by the deviation of the image of the outline on the screen 80 from an index circle 81 which is marked there. Both the feelers 70, 71 and their lenses can be used simultaneously. The focusing is helped by a large collimation lens 79.

The optical system is shown in Figure 4. A lamp 82 sends light through a collimating lens 83 and the graticule 76 on to the two projection lenses 72, 73. The lens 72 being opposite the graticule line 77 will project an image of this graticule line by way of mirrors 84, 85 and 86 on to the screen 80 where it appears as the line 87 on a greatly enlarged scale. Similarly the lens 73 projects the image of the graticule line 78 by way of the same mirrors on to the screen 80 where it appears as the line 88. Outside and inside the index line 81 are marked on the screen tolerance circles 89, 90 and the intention is that in the case of blades which are correct in form, the lines 87, 88 should always keep between the tolerance circles.

Figure 1:
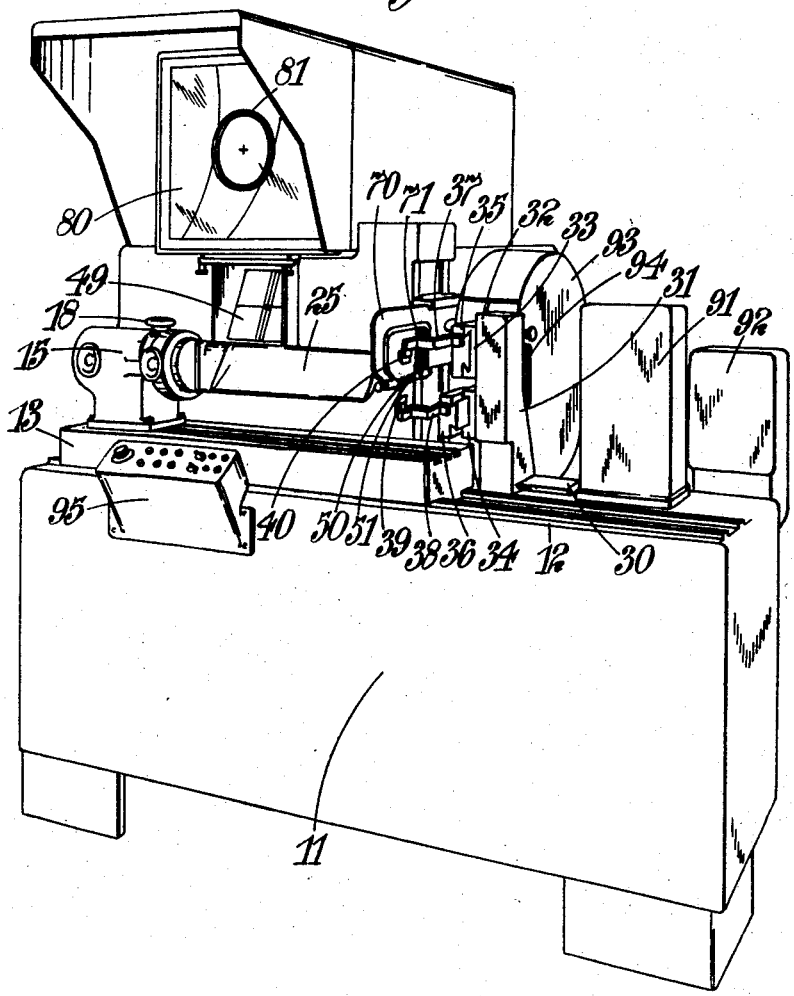
Figure 1 is a perspective view of a machine embodying the apparatus according to the present invention.

The mirror system containing the lenses 53, 54, the mirrors 59, 60, 61 and 62 are located in a casing 91 in Fig. 1 and some of the other mirrors are located in the base 11 of the machine. The lamp 82 and collimating lens 83 are located in a lamp house 92. The graticule holder 75, which contains a number of graticules and is mounted to rotate on a horizontal axis, is located in a casing 93 which has an aperture 94 to permit the passage of light from the lamp house 92 through the graticule inside the casing.

If desired, the movements of the various slides 33, 34, 35, 36, 70 and 71 and also the movements along the bed of the slides 13 and 31 can be effected automatically by means of small pneumatic or hydraulic motors under the control of push buttons located in a control box 95. This mechanism is substantially as described in the aforesaid patent specification No. 2,628,528.

In the use of this apparatus the gauge-member 26 which carries the locating pins is first inserted in the work-piece holder 24 and the two V-notched feelers 39, 40, which are mounted on the compound slides on the bracket 31, are brought into engagement with the locating pins 28, 29. The notched feelers 39, 40 are then adjusted vertically and the graticules 43, 44 are adjusted horizontally until the central spots under each of them coincide with the index mark 48 on the projection screen. The gauge is then taken out and a turbine-blade 25 which is to be gauged, is inserted in the holder 24. Assuming that the end of the turbine-blade is to be gauged first, the carriage 13 is adjusted so that the feeler-slide bracket 31 holds its feelers against the appropriate part of the end of the blade. If the blade is correct, and the three spots in each of the graticules 43, 44 have been correctly marked there, the images of one of the spots on each graticule will agree with the index mark 48 on the projection screen. If the blade is too wide, the images will be wider apart than the index marks. If it has a backward rake they will move to one side. If it has a forward rake they will move to the other side. If it is twisted differently from the standard, they will appear at an angle to the line joining the two index marks. If the blade is correct in these respects, the two outline feelers 50, 51 are now run over the blade, and serve to check whether the blade has the correct outline and thickness.

The measurements both of dimensions and of outline are then repeated upon another section of the turbine-blade and finally upon a third section.

The graticule-carrier which bears the graticules on which the outlines of the various sections are marked, holds six graticules, each of three of these bearing one of the outlines, and it is mounted so that it can be rotated against accurate locating means into three different positions in relation to the lenses 72, 73 on the contour-feeler-slides 70, 71. In the first position the outlines corresponding to the first section of the turbine-blade are brought into relationship with the lenses. In the second position, the second outline corresponding to the mid-section of the blade appears and in the third position the third outline appears. The other graticules may serve for another blade.

If the feelers show that the blade in any one of the positions is incorrect in size, shape position or twist, to an extent which carries it outside the tolerance lines, the hand wheels 18, 20 and 23 can be adjusted to bring the blade section nearer and by appropriate setting it may, where the deviations are not too bad, be possible to set the blade at a position where the tolerances are sufficient everywhere. In particular, if the edge positions shown by the notched feelers 39, 40 are incorrect, it is advantageous to adjust the blade by the hand-wheels 18, 20, 23 to the optimum position before checking the shape by feelers 50, 51, because otherwise the lines projected on screen 80 may deviate from the index circle on the screen to a greater degree than the shape actually deviates from the true, owing to the blade being bodily or angularly displaced.

The angular movement and the lateral or vertical movements necessary to effect these adjustments, can be noted by the operator and will show in his record the extent of the error which will require correction in mounting the blade for service. Many blades which might otherwise be rejected can thus be saved.

If the three spots on each graticule come so close to one another that they may appear simultaneously on the screen and cause possible confusion, it is possible to use a single tangent mark and displace it appropriately by means of a cam which is connected to the carriage. Alternatively the image of such a mark might be displaced by moving the lens or a prism or mirror by means of such a cam.

We claim:

1. An optical comparator comprising in combination a base, a work-piece holder thereon, a pair of opposed relatively movable feelers each of said feelers having two feeling surfaces set at an angle to one another, feeler-mounting means on the base enabling each feeler to move independently of the other in any direction in a plane intersecting a workpiece held in the holder, optical projection-screen-means, graticule means operatively connected with each of said feelers to move conjointly therewith, optical projection means including said graticule means and said projection screen means, whereby said optical projection means will project images of said graticule means onto said projection screen means to indicate the orientation of said workpiece, at least one additional feeler for tip engagement with said workpiece, said additional feeler being oriented at right angles and in a plane parallel to said pair of feelers, lens means operatively connected to said additional feeler means for conjoint movement therewith, means for mounting said additional feeler means and said lens means on said base, an additional optical projection system including additional graticule means and said lens means carried by said last mounting means for projecting an image of said additional graticule means on said projection screen to thereby indicate the movement of said additional feeling means when tracing out the contour of the work-piece, and means for adjusting the work-piece relatively to the holder in a plane parallel to that in which the feelers move to bring the path of movement of the additional feeler into register with an index marked on the screen-means.

2. An optical comparator as in claim 1 wherein said additional projection means includes an additional projection screen onto which said additional graticule image is projected, and wherein both of said projection screens are provided with standard indicia, whereby departures from said standard indicia of the graticule images projected on the respective screens indicate deviations in the work-piece from the desired characteristics thereof.

3. In an optical comparator, the combination of a fixed bed, a holder for a work-piece of generally elongated shape in cross-section transverse to the longitudinal axis of the work-piece, said holder being mounted on said bed and having a fixed pre-determined axis parallel to said bed, a pair of opposed relatively movable feelers, each of said feelers having two feeling surfaces set at an angle to one another which surfaces are brought into tangential contact with opposite surfaces at the ends of said work-piece during a gauging operation, means for mounting each of said feelers on said bed whereby each feeler is adapted to move independently of the other feeler in any direction in a plant intersecting said work-piece held in said holder, a graticule connected to each said feeler to move conjointly therewith, and optical projection means including a projection screen and both of said graticules to project images of said graticules on said screen, said projection screen being mounted on said bed in fixed relationship to the axis of said work-piece holder whereby the projected graticule image on said screen indicates the bodily location on said work-piece and the relationship of the projected graticule images to each other indicates the angular orientation of said work-piece.

4. An optical comparator as in claim 3 wherein said screen includes standard indicia in fixed pre-determined position relative to the axis of said work-holder to which indicia the projected graticule images are compared.

5. An optical comparator as in claim 4 including means for initially adjusting the position of said graticules with respect to said feelers to align the projected graticule images with said standard indicia on said projected screen when said feelers are properly positioned in accordance with a standard work-piece.

References Cited in the file of this patent

UNITED STATES PATENTS

| | | |
|---|---|---|
| 1,727,875 | Gallasch | Sept. 10, 1929 |
| 2,238,782 | Roche | Apr. 15, 1941 |
| 2,476,312 | Luety | July 19, 1949 |
| 2,542,755 | Dietrich | Feb. 20, 1951 |
| 2,580,239 | Murch | Dec. 25, 1951 |
| 2,621,556 | Beardsley et al. | Dec. 16, 1952 |
| 2,629,936 | Cronstedt | Mar. 3, 1953 |
| 2,703,456 | Smyth | Mar. 8, 1955 |